US010160033B2

United States Patent
Singh et al.

(10) Patent No.: US 10,160,033 B2
(45) Date of Patent: Dec. 25, 2018

(54) COLD ROLLING DEVICES AND COLD ROLLED ROTARY SHOULDERED CONNECTION THREADS

(71) Applicant: Schlumberger Technology Corporation, Sugar land, TX (US)

(72) Inventors: Rakesh Singh, Maharastra (IN); Ke Ken Li, Missouri City, TX (US); Michael Hui Du, Manvel, TX (US); Fei Song, Stafford, TX (US); Stephen Ray Stafford, Conroe, TX (US); Anthony Louis William Collins, Houston, TX (US); Keith Moriarty, Houston, TX (US); Doyle Brinegar, Conroe, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 148 days.

(21) Appl. No.: 14/737,451

(22) Filed: Jun. 11, 2015

(65) Prior Publication Data

US 2015/0367402 A1      Dec. 24, 2015

Related U.S. Application Data

(60) Provisional application No. 62/016,051, filed on Jun. 23, 2014.

(51) Int. Cl.
*B21H 3/04* (2006.01)
*B23G 9/00* (2006.01)

(52) U.S. Cl.
CPC .............. *B21H 3/04* (2013.01); *B21H 3/042* (2013.01); *B23G 9/009* (2013.01)

(58) Field of Classification Search
CPC .......... B21H 3/04; B21H 3/042; B21H 3/044; B21H 3/046; B21H 3/048; B23G 9/009
USPC ............................................................ 470/10
See application file for complete search history.

(56) References Cited

U.S. PATENT DOCUMENTS

| | | | |
|---|---|---|---|
| 3,953,996 | A | 5/1976 | Chernock |
| 3,996,780 | A | 12/1976 | German |
| 4,411,147 | A | 10/1983 | Capuano |
| 4,799,844 | A | 1/1989 | Chuang |
| 4,861,210 | A | 8/1989 | Frerejacques |
| 5,056,611 | A | 10/1991 | Yousef et al. |
| 5,163,523 | A | 11/1992 | Yousef et al. |

(Continued)

FOREIGN PATENT DOCUMENTS

| CN | 201768860 U | 3/2011 |
|---|---|---|
| CN | CN201865594 U | 6/2011 |

(Continued)

OTHER PUBLICATIONS

International Searching Authority, PCT/US2015/035527, Written Opinion, Accessed May 2018.*

(Continued)

*Primary Examiner* — Pradeep C Battula

(57) ABSTRACT

A method of cold rolling a thread on a tubular support member of a rotary shouldered thread connection includes obtaining an original root depth of a thread root, cold rolling the thread until a minimum increased root depth tolerance is achieved. The thread may be cold rolled with a wheel tip having an elliptical profile.

10 Claims, 6 Drawing Sheets

(56) References Cited

U.S. PATENT DOCUMENTS

| | | |
|---|---|---|
| 5,427,418 A | 6/1995 | Watts |
| 6,030,004 A | 2/2000 | Schock et al. |
| 6,196,598 B1 | 3/2001 | Yao |
| 6,447,025 B1 | 9/2002 | Smith |
| 6,467,818 B1 | 10/2002 | Snapp et al. |
| 6,729,658 B2 | 5/2004 | Verdillon |
| 6,799,664 B1 | 10/2004 | Connolly |
| 7,078,623 B1 | 7/2006 | Sheehan |
| 7,188,685 B2 | 3/2007 | Downton et al. |
| 7,210,710 B2 * | 5/2007 | Williamson .......... E21B 17/042 285/333 |
| 7,416,374 B2 | 8/2008 | Breihan et al. |
| 7,455,329 B2 | 11/2008 | Muradov et al. |
| 8,763,725 B2 | 7/2014 | Downton |
| 2002/0113436 A1 | 8/2002 | Verdillon |
| 2005/0189147 A1 | 9/2005 | Williamson et al. |
| 2006/0214421 A1 * | 9/2006 | Muradov .............. F16L 15/001 285/333 |
| 2007/0131412 A1 | 6/2007 | Finci et al. |
| 2007/0286694 A1 | 12/2007 | Glimpel et al. |
| 2010/0018699 A1 | 1/2010 | Hall et al. |
| 2010/0123311 A1 | 5/2010 | Church |
| 2010/0308577 A1 * | 12/2010 | Chin ..................... E21B 17/042 285/333 |
| 2011/0012347 A1 | 1/2011 | Pacheco |
| 2014/0333065 A1 | 11/2014 | Pacheco |
| 2015/0362100 A1 | 12/2015 | Li et al. |
| 2016/0136721 A1 | 5/2016 | Zhou |

FOREIGN PATENT DOCUMENTS

| | | |
|---|---|---|
| EP | 2606992 A1 | 6/2013 |
| JP | H10238548 A | 9/1998 |
| KR | 10-2012-0131020 A | 12/2012 |

OTHER PUBLICATIONS

International Preliminary Report on Patentability issued in International application PCT/US2015/035527 dated Jan. 5, 2017. 12 pages.
"Specification for Rotary Drill Stem Elements," ANSI/API Specification 7-1, Mar. 2006.
U.S. Appl. No. 14/737,443, filed Jun. 11, 2015.
International Search Report issued in related PCT application No. PCT/US2015/035527 dated Aug. 26, 2015.
First Office Action issued in Chinese Patent Application 201580034196.9 dated Jan. 3, 2018. 13 pages.
International Search Report and Written Opinion issued in International Patent application PCT/US2015/035451 dated Sep. 23, 2015. 16 pages.
International Preliminary Report on Patentability issued in International Patent application PCT/US2015/035451 dated Dec. 22, 2016. 14 pages.
First Office Action and Search Report issued in Chinese Patent Application 201580031589.4 dated Feb. 2, 2018. 8 pages.
Office Action issued in U.S. Appl. No. 14/737,443 dated Sep. 21, 2017. 6 pages.
Trishman, I.E., Method for the Improvement of Drill-collar Joints Evaluated by Full-size Fatigue Tests. Drilling and Production Practice, American Petroleum Institute, Jan. 1, 1952. New York, New York. 14 pages.

* cited by examiner

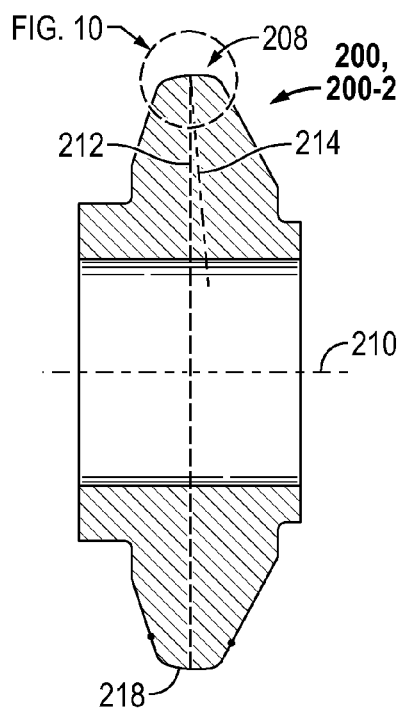
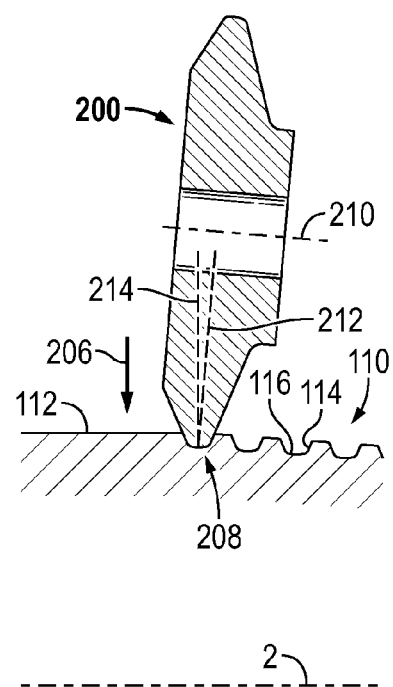
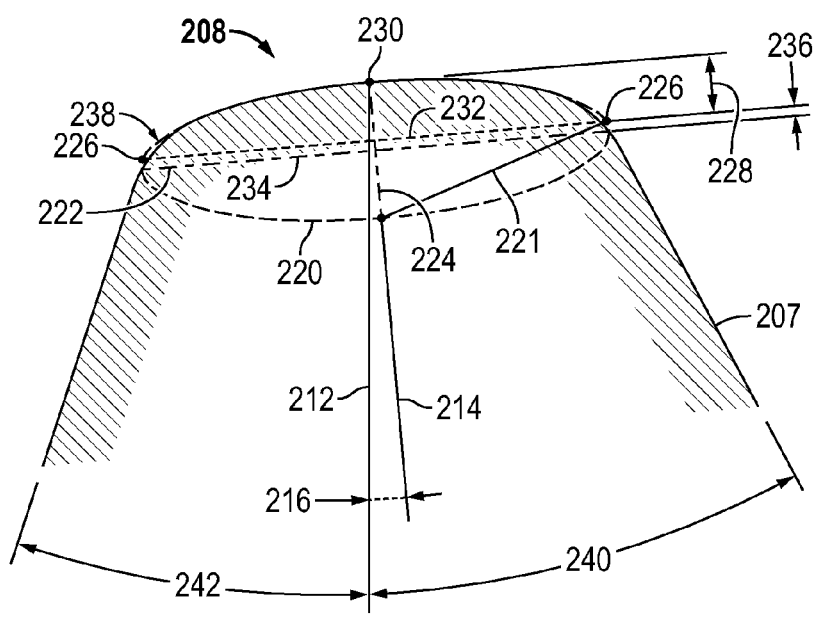

COLD ROLLING DEVICES AND COLD ROLLED ROTARY SHOULDERED CONNECTION THREADS

CROSS REFERENCE TO RELATED APPLICATIONS

This application claims the benefit of priority to U.S. provisional patent application No. 62/016,051, filed on Jun. 23, 2014, the entire content of which is incorporated herein by reference.

BACKGROUND

This section provides background information to facilitate a better understanding of the various aspects of the disclosure. It should be understood that the statements in this section of this document are to be read in this light, and not as admissions of prior art.

In downhole drilling, the drilling elements comprising a drilling tool are frequently coupled together by threaded structures. In these coupled drilling elements, the thread design is critical since failure often occurs in the thread structure. Whenever failure in the thread structure does occur, the initial crack starts at the thread root. This is due to the high stress concentrations located at the root of the threads when the thread structure is subject to severe loading.

SUMMARY

A method of cold rolling a thread on a tubular support member of a rotary shouldered threaded connection includes obtaining an original root depth of a thread root, cold rolling the thread until a minimum increased root depth tolerance is achieved. A thread cold rolling device in accordance to one or more embodiments includes a wheel having a wheel tip with an elliptical root profile having an equivalent root radius of about 0.057 inches to about 0.061 inches, a wheel angle of about 20 degrees to about 30 degrees, and a root depth of about 0.012 inches to about 0.020 inches.

The foregoing has outlined some of the features and technical advantages in order that the detailed description of the rotary shouldered connection that follows may be better understood. Additional features and advantages of the rotary shouldered connection will be described hereinafter which form the subject of the claims of the invention. This summary is not intended to identify key or essential features of the claimed subject matter, nor is it intended to be used as an aid in limiting the scope of the claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 9 illustrates a box rolling wheel having wheel tip with a tangential elliptical root shape in accordance to one or more aspects of the disclosure.

FIG. 10 illustrates the wheel tip of FIG. 9 in accordance to one or more aspects of the disclosure.

FIG. 11 illustrates a thread being cold rolled in accordance to one or more aspects of the disclosure.

DETAILED DESCRIPTION

Figure 1:
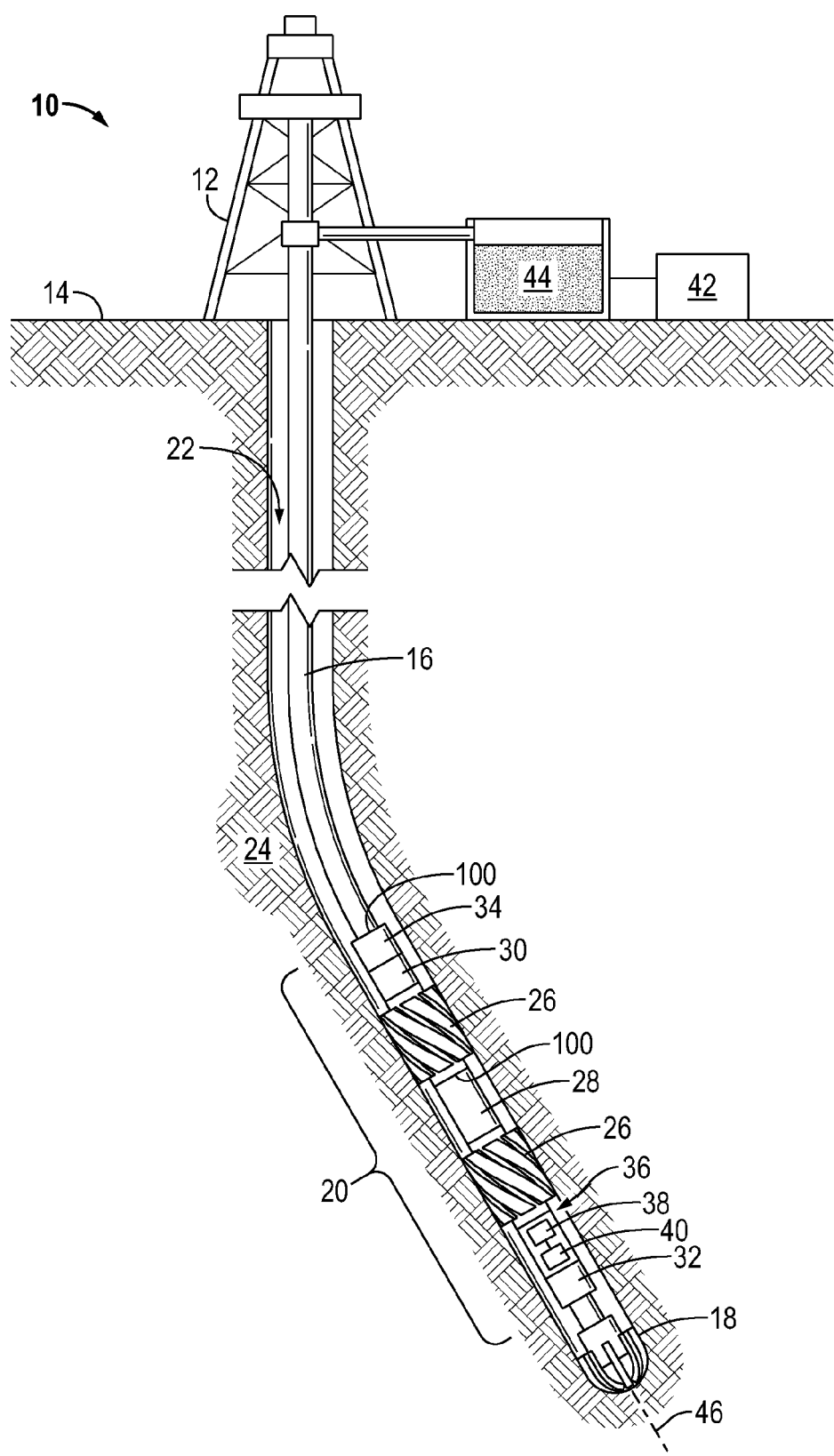
FIG. 1 illustrates a drilling system incorporating a rotary shouldered connection in accordance to one or more aspects for drilling a wellbore, for example, a high dog-leg severity wellbore.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element may be utilized to more clearly describe some elements. Commonly, these terms relate to a reference point such as the surface from which drilling operations are initiated.

FIG. 1 is a schematic illustration of an embodiment of a directional drilling system, generally denoted by the numeral 10, in which embodiments of rotary shouldered connections 100 may be incorporated. Directional drilling system 10 includes a rig 12 located at surface 14 and a drill string 16 suspended from rig 12. A drill bit 18 is disposed with a bottom hole assembly ("BHA") 20 and deployed on drill string 16 to drill (i.e., propagate) borehole 22 into formation 24.

The depicted BHA 20 includes one or more stabilizers 26, a measurement-while-drilling ("MWD") module or sub 28, a logging-while-drilling ("LWD") module or sub 30, and a steering device 32 (e.g., bias unit, RSS device, steering actuator, pistons, pads), and a power generation module or sub 34. The illustrated directional drilling system 10 includes a downhole steering control system 36, e.g. control unit or attitude hold controller, disposed with BHA 20 and operationally connected with steering device 32 to maintain drill bit 18 and BHA 20 on a desired drill attitude to propagate borehole 22 along the desired path (i.e., target attitude). Depicted downhole steering control system 36 includes a downhole processor 38 and direction and inclination ("D&I") sensors 40, for example, accelerometers and magnetometers. Downhole steering control system 36 may be a closed-loop system that interfaces directly with BHA 20 sensors, i.e., D&I sensors 40, MWD sub 28 sensors, and steering device 32 to control the drill attitude. Downhole steering control system 36 may be, for example, a unit configured as a roll stabilized or a strap down control unit. Although embodiments are described primarily with reference to rotary steerable systems, it is recognized that embodiments may be utilized with non-RSS directional drilling tools. Directional drilling system 10 includes drilling fluid or mud 44 that can be circulated from surface 14 through the axial bore of drill string 16 and returned to surface 14 through the annulus between drill string 16 and formation 24.

The tool's attitude (e.g., drill attitude) is generally identified as the axis 46 of BHA 20. Attitude commands may be inputted (i.e., transmitted) from a directional driller or trajectory controller generally identified as the surface controller 42 (e.g., processor) in the illustrated embodiment. Signals, such as the demand attitude commands, may be transmitted for example via mud pulse telemetry, wired pipe, acoustic telemetry, and wireless transmissions. Accordingly, upon directional inputs from surface controller 42, downhole steering control system 36 controls the propagation of borehole 22 for example by operating steering device 32 to steer the drill bit and to create a deviation, dogleg or curve in the borehole along the desired path. In particular, steering device 32 is actuated to drive the drill bit to a set point. The steering device or bias unit may be referred to as the main actuation portion of the directional drilling tool and may be categorized as a push-the-bit, point-the-bit, or hybrid device.

In point-the-bit devices, the axis of rotation of the drill bit 18 is deviated from the local axis of bottom hole assembly 20 in the general direction of the desired path (target attitude). The borehole is propagated in accordance with the customary three-point geometry defined by upper and lower stabilizer 26 touch points and the drill bit 18 touch point. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer.

In the push-the-bit rotary steerable system there is usually no specially identified mechanism to deviate the drill bit axis from the local bottom hole assembly axis; instead, the requisite non-collinear condition is achieved by causing either or both of the upper or lower stabilizers to apply an eccentric force or displacement in a direction that is preferentially orientated with respect to the direction of the borehole propagation. Again, there are many ways in which this may be achieved, including non-rotating (with respect to the hole) eccentric stabilizers (displacement based approaches) and eccentric actuators that apply force to the drill bit in the desired steering direction, e.g. by extending steering actuators into contact with the surface of the borehole. Again, steering is achieved by creating non co-linearity between the drill bit and at least two other touch points.

The drilling system may be of a hybrid type, for example having a rotatable collar, a sleeve mounted on the collar so as to rotate with the collar, and a universal joint permitting angular movement of the sleeve relative to the collar to allow tilting of the axis of the sleeve relative to that of the collar. Actuators control the relative angles of the axes of the sleeve and the collar. By appropriate control of the actuators, the sleeve can be held in a substantially desired orientation while the collar rotates. Non-limiting examples of hybrid systems are disclosed for example in U.S. Pat. Nos. 8,763,725 and 7,188,685.

The development of rotary steerable systems such as available under the POWERDRIVE™, e.g. the POWERDRIVE ARCHER®, trademark from Schlumberger Technology Corporation, has enabled the execution of high dog leg severity (DLS) drilling. As a result of the elevated degree of DLS, the bottom hole assembly (BHA) 20 components in the drill string 16 are subjected to higher bending cyclical loads. In turn, the increase in dynamic bending loads shortens the fatigue life of the components and failures occur, e.g., twist-off failures. Abundant field experience and theoretical analysis have shown that most fatigue failures occur at the rotary shouldered connections (RSCs) located at each end of the BHA components. Traditionally, the RSCs used have been standard API tapered threaded connections. While standard API threaded joints are widely used in the drilling industry, their fatigue strength is too low to meet the requirements imposed by the high DLS market.

Figure 2:
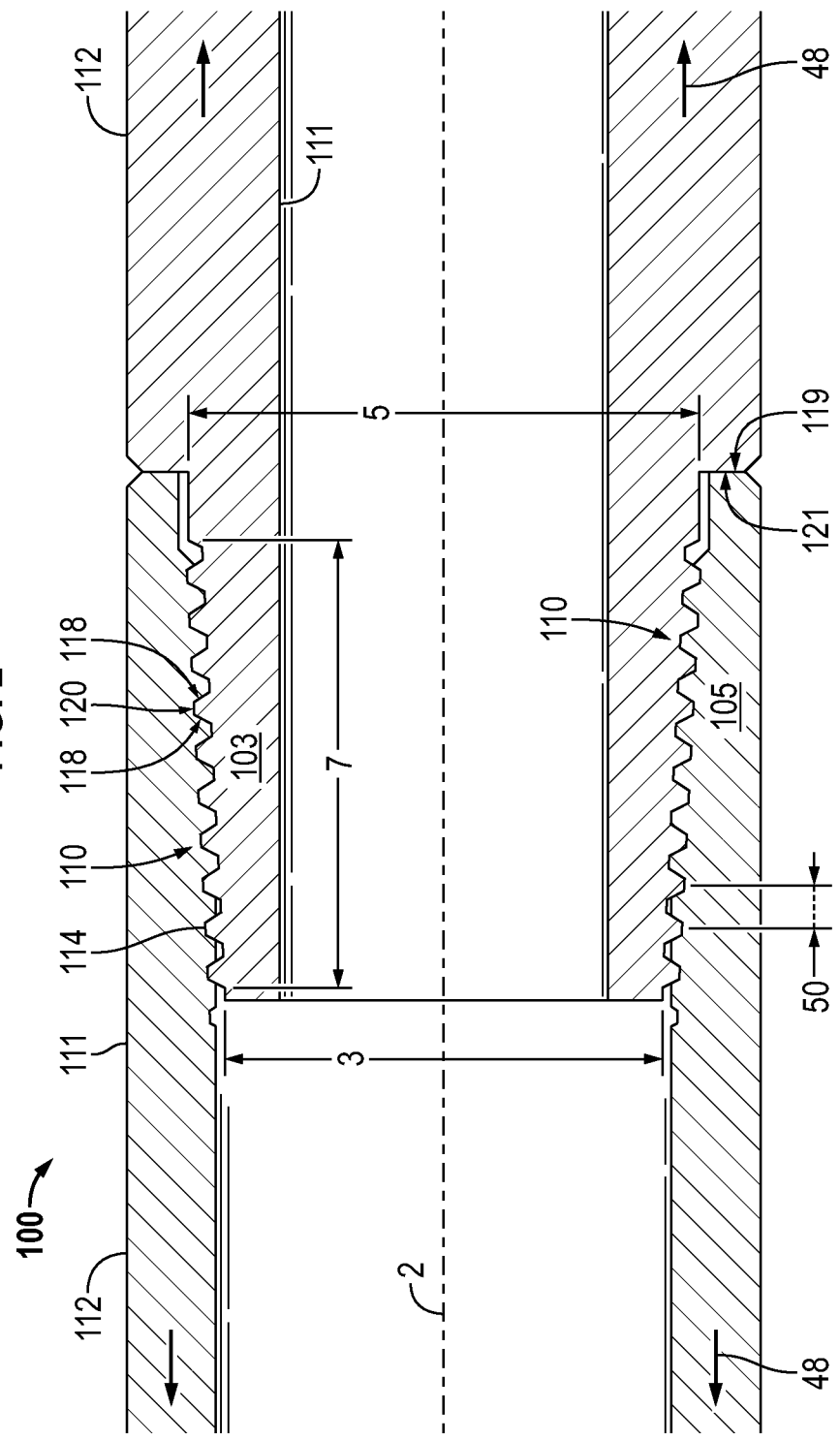
FIG. 2 illustrates a rotary shouldered connection according to one or more aspects of the disclosure.

When fatigue failure occurs in the threaded connection, the crack tends to initiate at the thread root of the weaker member (pin or box). An optimized root design is critical to reducing stress concentration in the root, thereby enhancing fatigue strength. FIG. 2 illustrates a rotary shouldered connection (RSC) 100 in accordance to one or more embodiments having a thread structure 110 design for high-DLS (dog-leg severity) field joints, i.e. connections. Rotary shouldered connection 100 includes a pin end 103 of a member 112 having external thread structures 110 and a box end 105 of another member 112 having internal thread structures 110. Members 112 are cylindrical or tubular support members, e.g., pipe, collars. The RSC 100 is illustrated in FIG. 2 made-up with the pin end shoulder 119 and the box end shoulder 121, e.g., contact surfaces, contacting one another. The threaded connection is subject to a tensile load 48 along the longitudinal axis 2-2 of the connection. With reference to FIG. 1, rotary shouldered connection 100 is described in particular with reference to the bottom hole assembly 20, however, rotary shouldered connections 100 may be utilized throughout the drill string 16.

Figure 3:
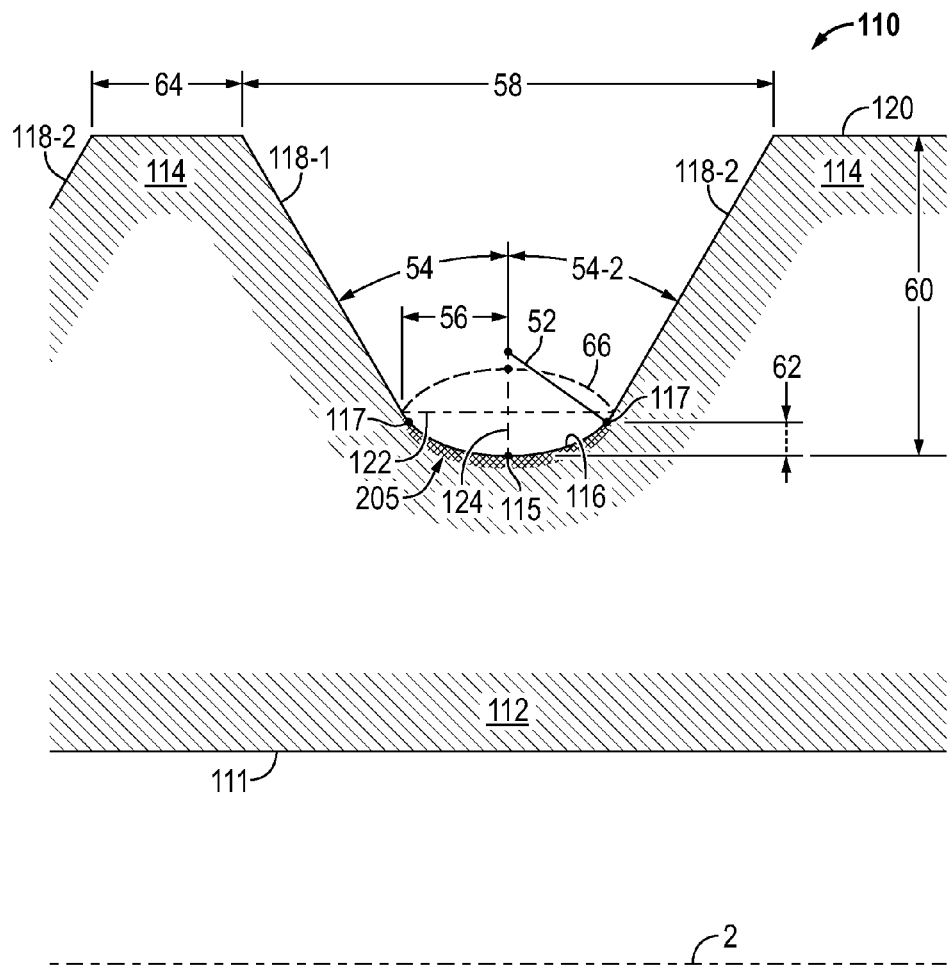
FIG. 3 illustrates a thread structure and a thread root according to one or more aspects of the disclosure.

FIG. 3 illustrates a thread structure 110 in accordance to one or more embodiments. With continued reference in particular to FIGS. 2 and 3, RSC 100 has a tangential elliptical thread root portion 116 design with an optimized root depth 62 and thread parameters such as pitch 50, equivalent root radius 52, and flank angle 54 which corresponds to flank 118-1 in FIG. 3. The flank angle of the flank 118-2 on the opposite side of root portion 116 is identified with the reference number 54-2. As will be understood by those skilled in the art with benefit of the disclosure flank angles 54 and 54-2 may be the same or different. Analytical and numerical results indicate that the rotary shouldered connection 100 thread designs significantly increase the BHA connection life under high-DLS conditions compared to commonly used standard API threads. For example, at 15 deg./100 ft DLS, a minimum factor 4 enhancement in fatigue life is predicted compared to NC38 thread, which is the most commonly used API connection for example for 4.75 inch tools.

At least one thread 114 extends helically along the cylindrical support member 112 in spaced thread turns. Thread 114 may be a single start helix or a double start helix. The thread structure may have a taper described for example as a uniform change in the diameter of a work piece measured along its axis and measured for example in taper per foot, taper per inch, in degrees, and for example in the metric system as a ratio of diameter change over length. With reference to FIG. 2 a taper may be defined in terms of the change in diameter between first diameter 3 and second diameter 5 along the length 7. The thread structure may have a pitch 50, shown from crest to crest in FIG. 2, identified in terms of threads per length or distance between crests. For example, a rotary shouldered connection having three threads per inch (TPI) may also be referred to as having a pitch of ⅓" or 0.3336 inches.

Wall surface 111 represents the external cylindrical surface of a box end 105 thread structure 110 or the central bore surface of a pin end 103 thread structure 110. A thread root portion 116 is located between adjacent threads 114, i.e. adjacent thread turns. The root portion 116 has a root bottom 115 and a curved surface extending between flank transition points 117. Thread structure 110 includes flanks, generally identified with reference number 118 and specifically as 118-1 and 118-2, on opposing sides of crest 120. One of flank 118-1 and 118-2 may be load bearing, e.g., 118-1, and the other of flank 118-1 and 118-2 a non-load bearing, or stab, flank, e.g., 118-2. When the thread structure is subject to loading the forces will be transmitted between coupled pin end 103 and box end 105 thread structures via contiguous mating load bearing flanks 118-1 of the respective pin and box threads, see e.g., FIG. 2.

FIG. 3 depicts a thread structure 110 having a tangential elliptical root portion 116 design. The depicted root portion 116 has a curvature defined by a portion of an ellipse 66, tangentially adjoining the two flanks 118, a load bearing flank 118-1 and a non-load bearing flank 118-2, of the adjacent threads 114, i.e. thread turns, at flank transition points 117. The ellipse 66 has a major axis 122 and a shorter minor axis 124 extending perpendicularly from the major axis. The major axis 122 extends parallel with the longitudinal axis 2-2 of the support member 112. Minor axis 124 extends radially outward and perpendicular from the support member 112, e.g., perpendicular to the axis 2-2. For example, minor axis 124 may extend radially outward from root bottom 115. The root depth 62 extends from the flank transition point 117 to the root bottom 115. In FIG. 3, the major axis 122 is illustrated vertically offset from intersecting the transition points 117 and positioned vertically above the transition point 117 relative to the root bottom 115.

The transition points 117 are points of tangency of the extending flanks 118 with the ellipse 66. The flank angles 54 of the adjacent flanks 118 separated by root portion 116 or the flanks separated by crest 120 may be equal or different. In FIG. 3, the flank angle 54 of adjacent load bearing and non-load bearing flanks are equal and the surface area of the load flank bearing and non-load bearing flank are equal. In some embodiments, the flank angles of the adjacent load and non-load flanks may be different. The depicted root portion 116 curvature is symmetric, however the root curvature may be asymmetric.

With reference to FIGS. 2 and 3, thread structure 110 includes the thread parameters described in Table 1 below.

TABLE 1

| Name | Symbol | Reference No. |
|---|---|---|
| Pitch | | 50 (FIG. 2) |
| Equivalent Root Radius | R | 52 (FIG. 3) |
| Flank Angle | FA | 54 (FIG. 3) |
| Root Semi-Width at Flank Transition Point | SW (SW = Rcos(FA)) | 56 (FIG. 3) |

TABLE 1-continued

| Name | Symbol | Reference No. |
|---|---|---|
| Root Width at Crest | RW (RW = Pitch − (Crest Width)) | 58 (FIG. 3) |
| Truncated Thread Height | TH (TH = [RW/2 − Rcos(FA)]/tan(FA) + RD) | 60 (FIG. 3) |
| Root Depth between Flank Transition Points 117 and Root Bottom 115 | RD | 62 (FIG. 3) |
| Crest Width | | 64 (FIG. 3) |

The thread structure 110 of RSC 100 has larger pitch 50 and larger equivalent root radius 52, and smaller flank angle 54, relative to a round root configuration for example of a standard API NC38 thread, to reduce stress concentration in the root portion 116 and maintain shear resistance and galling resistance of the thread. Various root designs such as circular, tangential ellipse, non-tangential ellipse, and cubic spline are contemplated, and finite element analysis (FEA) of a notched specimen indicates that using a tangential elliptical shape is most effective in reducing stress concentration in the root portion.

Figure 4:
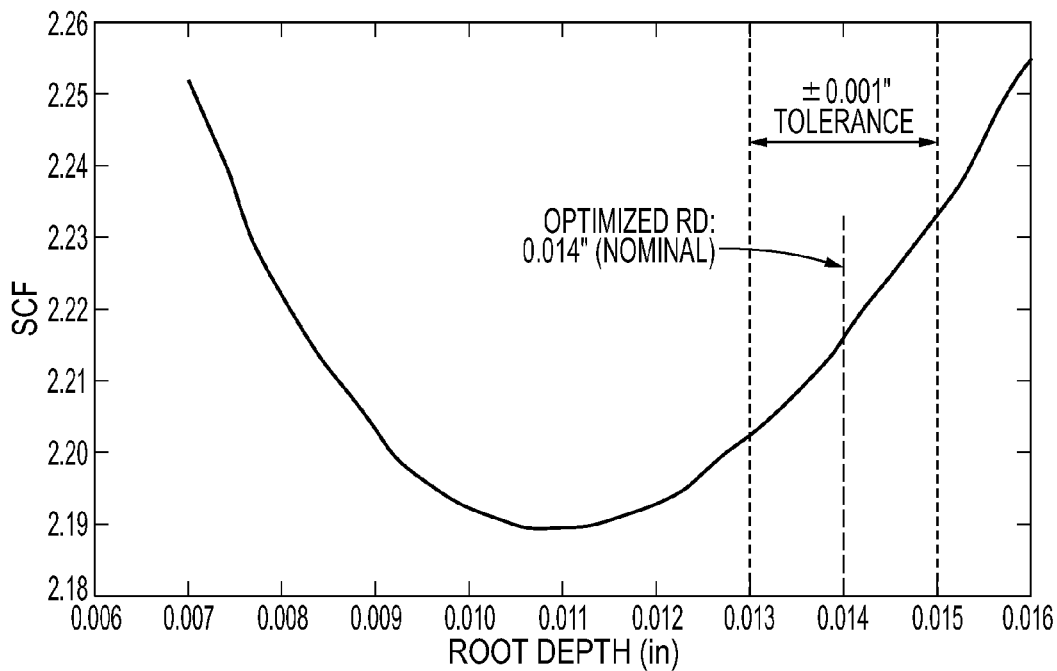
FIGS. 4 and 5 graphically illustrate stress characteristics of a thread root according to one or more aspects of the disclosure.
Figure 5:
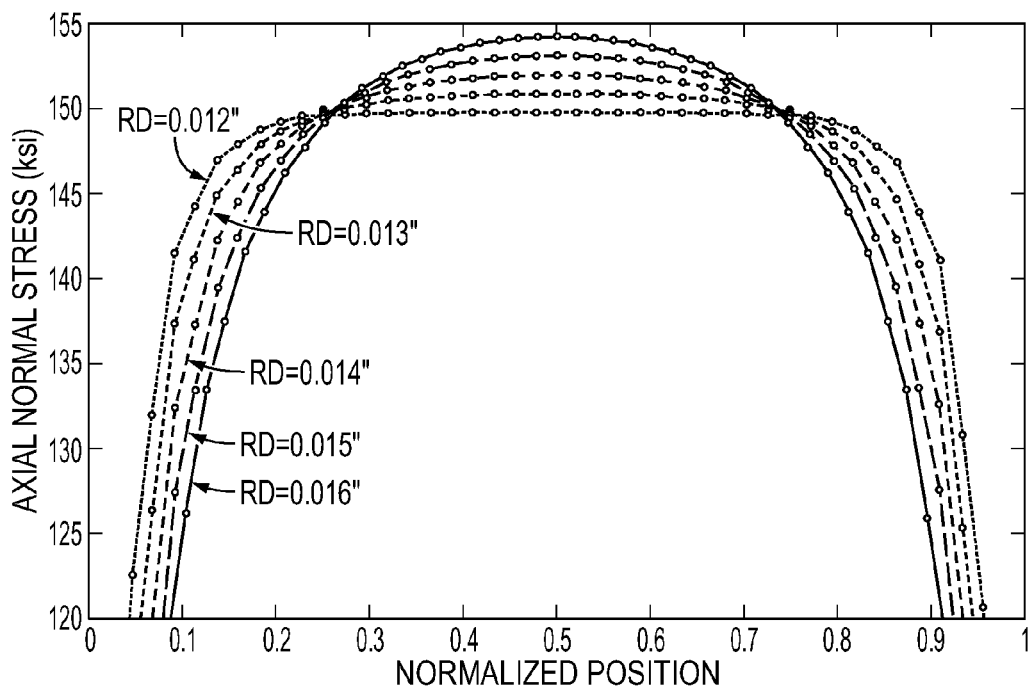
Figure 6:
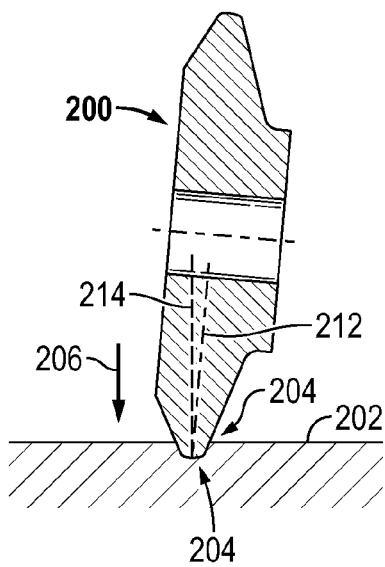
FIG. 6 illustrates a cold rolling wheel in accordance to one or more aspects of the disclosure being applied against a notched sample in a finite elemental analysis process.

In accordance to some aspects, the root portion 116 in the thread structure 110 has an equivalent root radius 52 defined by a portion of an ellipse 66, tangentially adjoining the two flanks 118 of the adjacent threads 114, see e.g. FIG. 3. The "equivalent radius" or "equivalent root radius" is the local radius of the ellipse at the transition point where the flank 118 is tangent to the ellipse 66, i.e., transition point 117. With reference to FIG. 3, the equivalent radius 52 extends at a right angle to the flank at the tangent point 117 to the ellipse center which corresponds to minor axis 124 in FIG. 3. The thread structure 110 with an equivalent root radius 52 that is longer than a circular or round radius provides a greater relief in stress concentration in the root. For a given root semi-width 56, the root depth 62 can be optimized such that the peak stress is maintained in the middle of the root portion 116, with the manufacturing tolerance considered (e.g. machined or cold rolled). For example, the nominal dimensions in the proximity of a root depth 62 of about 0.014 inches (RD=0.014 inches) if machined, or about 0.015 inches if cold rolled, and a root semi-width 56 of about 0.53 inches (SW=0.053 inches) are illustrated in FIGS. 4 and 5. FIG. 4 illustrates the root depth 62 plotted against a stress concentration factor (SCF). Stress concentration factor (SCF) may for example be a local peak alternating stress in a component divided by the nominal alternating stress in the pipe wall at the location of the component. FIG. 5 illustrates a normalized position against the axial normal stress in kilopounds per square inch (ksi) for various dimensions of root depth 62 in inches.

FEA results demonstrate that thread structure 110 has the similar tensile/shear capacity as standard API NC38 thread. A summary of non-limiting examples of primary thread parameters of thread structures 110 in accordance to one or more embodiments are listed in Table 2.

TABLE 2

| | |
|---|---|
| Root Semi-Width 56 | ~0.050 to ~0.061 inches |
| Equivalent Root Radius 52 | ~0.057 to ~0.061 inches |
| Flank Angle 54 | ~20° to ~30° |
| Crest Width 64 | ~0.1 to ~0.2 inches |
| Root Depth 62 | ~0.012 to ~0.020 inches |
| Semi-Major Axis 122 | ~0.050 to ~0.055 inches |

TABLE 2-continued

| | |
|---|---|
| Semi-Minor Axis 124 | ~0.013 to ~0.020 inches |
| Taper (T.P.F.) | ~1.0 to ~1.5 taper per foot |
| Pitch (T.P.I.) 50 | ~3 threads per inch |

In accordance to one or more aspects, the characteristics of a rotary shouldered connection 100 includes a thread structure 110 having a tangential elliptical root portion 116 design with one or more of an equivalent root radius 52 of approximately 0.059 inches and a root depth 62 of approximately 0.014 inches, a single-start helix thread 114, pitch 50 of about 3 threads per inch, taper of about 1.25 taper per foot, and a flank angle 54 of about 25 degrees, for example the flank angle 54 of flank 118-1 in FIG. 3, a semi-major axis length of about 0.053 inches and a semi-minor axis length of about 0.016 inches. The flank angles 54 and 54-2 may be the same or different. In accordance to some embodiments a life enhancement minimum factor of 2 to 4 based on connection FEA. The average contact pressure on the load bearing flank 118-1 induced by makeup torque (MUT) may increase by about 6 to 15 percent. The average contact pressure on a shoulder 119, 121, e.g., induced by MUT, may increase by about 8 to 10 percent. Sealing may improve relative to the API standard NC38 thread. The thread structure 110 may have similar tensile capacity and shear capacity to the API standard NC38 thread. In accordance to some aspects, compressive treatments such as shot-peening and cold-rolling may be applied to the thread structure to further improve fatigue life of the threads.

In accordance to one or more aspects, the thread structure 110 may have an equivalent root radius 52 of about 0.057 inches to about 0.061 inches, a flank angle 54 of about 20 to about 30 degrees, a crest width 64 of about 0.1 to about 0.2 inches, and a root depth 62 of about 0.012 to about 0.020 inches. The thread structure 110 may have a root semi-width 56 at flank transitions points of about 0.050 to about 0.060, a pitch 50 of about three threads per inch, and a taper of about 1.0 to about 1.5 taper per foot. The major axis 122 may have a semi-major axis length for example of about 0.050 inches to about 0.055 inches and a semi-minor axis 124 length of about 0.013 to about 0.020 inches.

In accordance to one or more embodiments, a thread structure 110 has a tangential elliptical root portion 116 geometry with an equivalent root radius of about 0.057 inches to about 0.061 inches, a flank angle of about 25 to about 27.5 degrees, and a root depth of about 0.014 to about 0.016 inches.

Methods for cold rolling rotary shouldered connections and forming a cold rolled thread root geometry are now described with reference to FIGS. 1 to 11. Cold rolling of a rotary shouldered connection 100 includes forcing the tip of a hardened roller or wheel, generally denoted by the numeral 200, into the thread root 116 and traversing it along the thread 114 helix. A surface layer 205 (FIG. 3) of compressive residual stress is generated, and the root portion 116 surface becomes smoother as a result of the process. Both effects help delay the initiation of fatigue cracking.

The designs of the wheels 200, e.g. rollers, may be established and optimized based on finite element analysis (FEA) of a notched specimen 202, with the notch 204 design substantially identical to the thread root 116 design of thread structure 110, see e.g. FIG. 3 and Table 2. A wheel 200 design may be first generated based on the thread root 116 geometry and then mathematically constructed in the FEA model. The wheel 200 is then radially pressed, for example with a hydraulic ram, against the notch 204 with a force represented by the arrow 206 as illustrated for example in FIG. 6. A larger amount of force 206 may be required to cold roll the tangential elliptical root 116 compared to a circular root (i.e., API threads). The resulting distribution of residual stress in the vicinity of the notch 204 is evaluated. The geometric parameters of the wheels 200 are then adjusted and an FEA model is reconstructed to achieve an optimal residual stress distribution.

Figure 7:
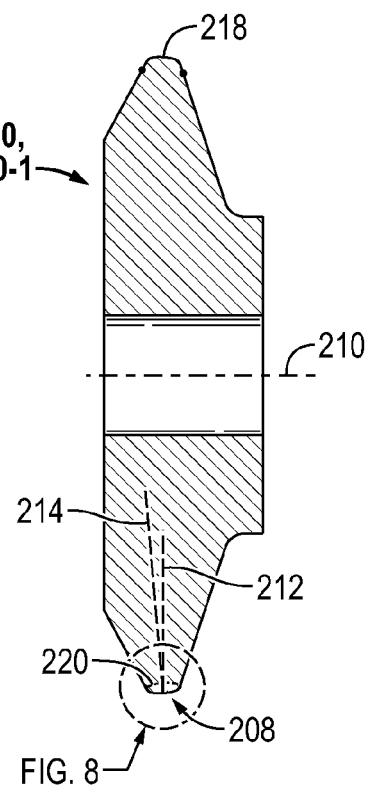
FIG. 7 illustrates a pin thread cold rolling wheel having a tangential elliptical root shaped wheel tip in accordance to one or more aspects of the disclosure.
Figure 8:
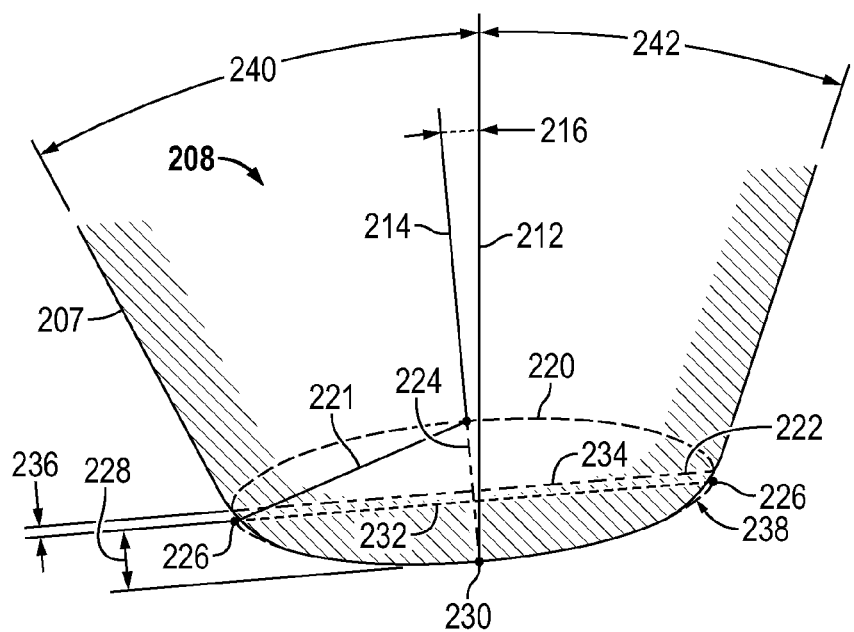
FIG. 8 illustrates the wheel tip of FIG. 7 in accordance to one or more aspects of the disclosure.

FIG. 7 illustrates a wheel 200, also referred to as a pin wheel 200-1, for cold rolling the threads on a pin end 103 (FIG. 2) of a support member 112 and FIG. 9 illustrates a wheel 200, also referred to as a box wheel 200-2, for cold rolling the threads on a box end 105 (FIG. 2) of a support member 112. FIG. 8 is an expanded view of the wheel tip 208 of the pin wheel and FIG. 10 is view of the wheel tip 208 of the box wheel. Wheels 200 rotate about wheel axis 210. The center axis of wheel 200 is shown by the line 212 which is perpendicular to wheel rotational axis 210. A root contact axis 214 is offset from the wheel rotational axis 210 by a wheel offset angle 216 (FIGS. 8 and 10). With additional reference to FIG. 11, the wheel 200 may be tilted relative to the longitudinal axis 2-2 of the support member 112 when cold rolling the threads due to the taper of the threads 114. For example, when cold rolling the thread structure 110 the wheel 200, i.e. the wheel tip 208, is positioned in the thread root 116 and the wheel 200 may be tilted such that the center axis 212 of the wheel is at a non-perpendicular angle, i.e. wheel offset angle 216, to the longitudinal axis 2-2 of the tubular support member 112.

In accordance to one or more aspects, the wheels 200 may be constructed of high-strength steel. In accordance to an aspect, the wheel material is ASTM E52100 Steel with 60-62 HRC/D2 with 58-60 HRC. The wheels have a profile surface 218 finish proximate the tip having a roughness. For example, the profile surface may have an average roughness ("Ra") of about 8 to about 32 micro-inches (0.2 to 0.8 micro-meters). In accordance to an aspect, the wheel profile surface 218 may have a roughness of about 16 micro-inches (0.4 micro-meters).

Wheel tips 208 have a tangential elliptical profile shape 220 (ellipse 220) corresponding to the tangential elliptical shape 66 of the threads 114 in FIGS. 2 and 3 and accounting for a tolerance for increase in the dimensions of the machined thread structure 114 as a result of cold rolling. Ellipse 220 has a major axis 222, minor axis 224, and equivalent root radius 221. Points 226 are the flank intersection points with the ellipse 220. The root depth 228 of the tangential elliptical shaped wheel tip 208 extends between the flank intersection points 226 and the center root contact point 230 corresponding for example to root bottom 115 in FIG. 3. Root depth 228 may correspond substantially to the root depth 62 of a machined thread before being cold rolled. A line 232 intersecting the flank intersection points 226 may be offset from the ellipse center point 234 by an offset distance 236. Wheel tip 208 includes a wheel corner radius 238 and first and second wheel angles 240 and 242. Wheel angles 240 and 242 are measured in FIGS. 8 and 10 between the wheel center axis 212 and the opposing sides of the outer surface 207 of the wheel tip 208. First wheel angle 240 corresponds to one of first flank angle 54 and second flank angle 54-2 and second wheel angle 242 corresponds to the other of first flank angle 54 and second flank angle 54-2.

In accordance with an aspect of the disclosure, a tolerance of root depth 62 (FIG. 3) increase due to cold rolling may be established at about 0.001 inches to about 0.004 inches. In accordance to some embodiments, a tolerance of depth increase may be established at about 0.002 inches to about 0.003 inches. In an example it was numerically determined that when the root depth 62 (FIG. 3) increase reaches a minimum of about 0.002 inches, the resulting residual stress distribution is favorable for fatigue enhancement. An upper limit, for example about 0.003 inches, of the root depth 62 increase was also determined. Further increase of the root depth 62 may adversely affect the fatigue strength of the connection by deviating the rolled root geometry of the thread structure 110 away from an optimized root geometry, see, e.g., FIG. 3 and Table 2.

In accordance to one or more embodiments, wheels 200 include a tangential elliptical root shape 220 at the wheel tip 208 having characteristics similar to the tangential elliptical root shape illustrated in FIG. 3. In accordance to one or more embodiments, the wheels 200 include a tangential elliptical root shape 220 at the wheel tip 208 having characteristics similar to the tangential elliptical root shape parameters of Table 2.

In accordance to an embodiment, wheels 200 have wheel tip 208 with a tangential elliptical root shape 220 having an equivalent root radius 221 of about 0.057 inches to about 0.061 inches and a root depth 228 of about 0.012 to about 0.020 inches. A first wheel angle 240 may be about 20 degrees to about 30 degrees, see e.g. flank angle 54 illustrated in FIG. 3. Second wheel angle 242 may be different from or the same as the first wheel angle 240. In accordance to one or more embodiments, the first wheel angle 240 may be about 20 degrees to about 30 degrees and the second wheel angle 242 may be about 15 degrees to about 25 degrees. In accordance to an embodiment, the first wheel angle 240 may be about 25 degrees to about 29 degrees and the second wheel angle 242 may be about the same as the first wheel angle or different for example about 17 degrees to about 20 degrees.

In accordance to an embodiment, a major axis 222 of the elliptical profile 220 of the wheel tip 208 may have a semi-major axis length of about 0.050 to about 0.055 inches and a minor axis 224 of the elliptical profile 220 of the wheel tip may have a semi-minor axis length of about 0.013 to about 0.020 inches. In accordance to an aspect, a major axis 222 of the elliptical profile of the wheel tip may have a semi-major axis length of about 0.053 inches and a minor axis 224 of the elliptical profile of the wheel tip may have a semi-minor axis length of about 0.016 inches.

In accordance to an embodiment, a wheel 200 has a wheel tip 208 with a tangential elliptical root shape 220 with an equivalent root radius 221 of about 0.058 inches and a root depth of about 0.014 inches, a first wheel angle 240 of about 28 degrees, a second wheel angle 242 of about 18 degrees, a wheel corner radius 238 of about 0.030 inches, a major axis 222 of the elliptical profile 220 of the wheel tip may have a semi-major axis length of about 0.053 inches, a minor axis 224 of the elliptical profile of the wheel tip 208 may have a semi-minor axis length of about 0.016 inches, and a wheel offset angle 216 of about 3 to about 7 degrees from perpendicular to the longitudinal axis of the support member 112 during cold rolling, see e.g., FIG. 11. In accordance to an aspect the wheel offset angle 216 is about 5 degrees.

In accordance to one or more aspects, a method for rolling a rotary shouldered connection having a thread structure with a tangential elliptical root shape is now described with reference to FIGS. 1-11. A thread 114 is formed, for example, by threading on a cylindrical support member 112. The thread root depth 62 of the machined thread root depth is obtained and recorded, for example as the initial, as-machined thread root depth. A rolling device may be preloaded, for example to about 2,000 to 3,000 psi, before inserting the wheel 200 into the thread root 116. Insert the wheel 200, i.e., wheel tip 208, into the thread, see e.g. FIG. 11. Increase the load 206, for example about 250 to about 1,000 psi when the rolling wheel 200 contacts the thread root 116, for example wheel tip 208 contacting root portion 116. Roll the thread roots 116 one at a time with the increased load pressure 206. After rolling the thread roots one at a time, remove the wheel 208 from the thread root and measure the thread root depth 62, for example using a thread depth gauge.

If the change in root depth 62 of the root 116 is less than the minimum of the selected reasonable tolerance, for example about 0.002 inch, then re-apply the rolling wheel 200 and increase the load pressure 206 incrementally to be between about 3,000 to about 4,000 psi or greater. Repeat the process until the measured thread root depth 62 as increased is greater than the reasonable tolerance selected, for example greater than 0.002 inches.

In accordance to aspects, the full-scale fatigue test data of cold rolled rotary shouldered connections showed that the rolled connection is about 3 to about 5 times stronger than the as-machined connection.

The foregoing outlines features of several embodiments of rotary shouldered connection so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of cold rolling a thread on a tubular support member of a rotary shouldered threaded connection, comprising:
    obtaining an original root depth of a thread root;
    cold rolling the thread, comprising:
        inserting a wheel having a wheel tip with an elliptical root profile into the thread;
        applying a first load when the wheel tip contacts the thread root;
        rolling the wheel tip through the thread root; and
        removing the wheel tip from the thread;
    determining, after the cold rolling, an increased root depth relative to the original root depth;
    comparing the increased root depth to a minimum increased root depth tolerance; and
    cold rolling the thread at a second load if the increased root depth does not exceed the minimum increased root depth tolerance,
    wherein the elliptical root profile of the wheel tip has an equivalent root radius of about 0.057 inches to about 0.061 inches, a major axis having a semi-major axis length of about 0.050 inches to about 0.055 inches, and a minor axis having a semi-minor axis length of about 0.013 to about 0.020 inches.

2. The method of claim 1, wherein the minimum increased root depth tolerance is about 0.001 inches to about 0.004 inches.

3. The method of claim 1, wherein the minimum increased root depth tolerance is about 0.002 inches.

4. The method of claim 1, wherein the elliptical root profile of the wheel tip comprises:
   a first wheel angle of about 20 degrees to about 30 degrees; and
   a root depth of about 0.012 inches to about 0.020 inches.

5. The method of claim 4, further comprising a second wheel angle of about 15 degrees to about 20 degrees.

6. The method of claim 4, wherein the wheel is offset about 3 to about 7 degrees from perpendicular to a longitudinal axis of the tubular support member.

7. A method of cold rolling a thread structure, comprising:
   positioning a wheel tip of a cold rolling wheel in a thread root of a thread extending helically along a tubular member in spaced thread turns, the thread comprising a crest extending between a first flank and a second flank and the thread root extending between the thread turns and having a curvature defined by a portion of an ellipse tangentially adjoining the first and second flank at respective flank transition points, the ellipse having a major axis extending parallel to a longitudinal axis of the tubular member and a minor axis extending perpendicular to the major axis and through a root bottom;
   rolling the wheel tip through the thread root;
   increasing a root depth of the cold rolled thread; and
   removing the wheel tip from the thread root, wherein the cold rolled thread comprises:
   an equivalent root radius of about 0.057 to about 0.061 inches;
   a first flank angle relative to the minor axis of about 20 to about 30 degrees;
   the root depth is about 0.012 to about 0.020 inches;
   a pitch of about three threads per inch; and
   a taper of about 1.0 to about 1.5 tapers per foot.

8. The method of claim 7, wherein the increasing the root depth comprises increasing the root depth between about 0.001 and about 0.004 inches by rolling the thread root.

9. The method of claim 7, wherein:
   the equivalent root radius of the cold rolled thread is about 0.057 to about 0.059 inches;
   the first flank angle relative to the minor axis of the cold rolled thread is about 24 to about 28.5 degrees;
   the root depth of the cold rolled thread is about 0.013 to about 0.016 inches; and
   the taper of the cold rolled thread is about 1.0 to about 1.5 tapers per foot.

10. The method of claim 9, wherein the increasing the root depth comprises increasing the root depth between about 0.001 and about 0.003 inches by rolling the thread root.

* * * * *